Jan. 20, 1925.
J. A. SLAMA
1,523,663
ADJUSTABLE CLAMPING MEMBER
Filed Dec. 31, 1923
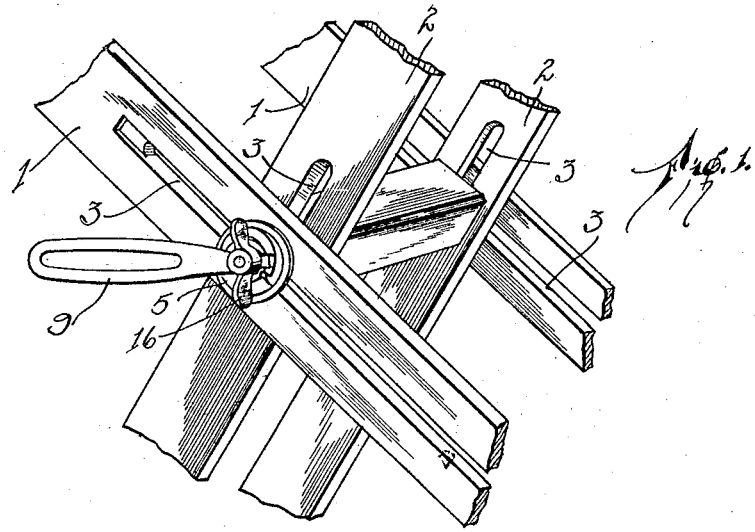
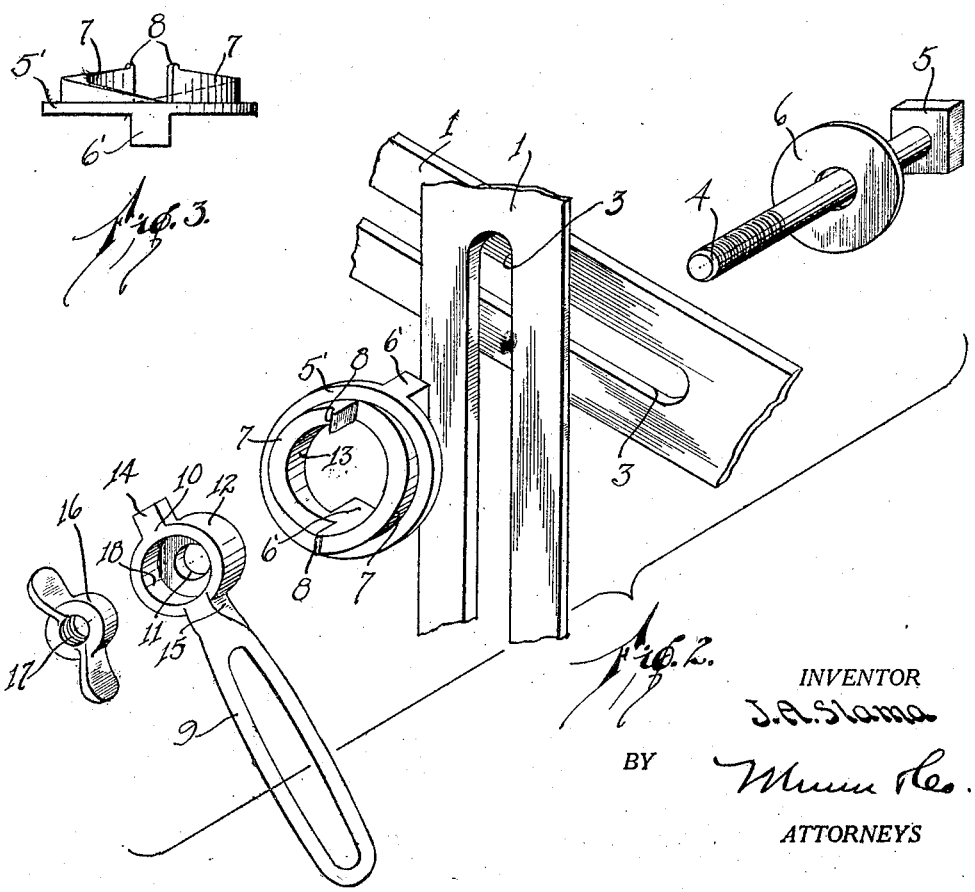
INVENTOR
J. A. Slama
BY
ATTORNEYS Patented Jan. 20, 1925.

1,523,663

UNITED STATES PATENT OFFICE.

JOHN A. SLAMA, OF RACINE, WISCONSIN.

ADJUSTABLE CLAMPING MEMBER.

Application filed December 31, 1923. Serial No. 683,787.

*To all whom it may concern:*

Be it known that I, JOHN A. SLAMA, a citizen of the United States, and a resident of Racine, in the county of Racine and State of Wisconsin, have invented a new and useful Improvement in Adjustable Clamping Members, of which the following is a full, clear, and exact description.

My invention relates to improvements in adjustable clamping members, and it consists in the combinations, constructions, and arrangements herein described and claimed.

An object of my invention is to provide an adjustable clamping member for securing such members as the cooperating adjustable supporting members of an ironing board or the like against movement relative to one another.

The ordinary type of collapsible frame for ironing boards, work table, clothes racks, etc., have members for clamping the adjustable frame in adjusted position. These members usually consist in a bolt having a wing nut or the like thereupon which must be turned upon the bolt until the adjacent parts of the frame are clamped in close engagement with one another. Obviously the operation of tightening the wing nut or similar member upon the bolt involves turning the nut several times. My present invention provides a clamping member which may be locked with less than a half turn of the clamping lever.

A further object of my invention is to provide an adjustable clamping member of the type described which may be adjusted to accommodate various thicknesses of the superimposed frame members.

A further object of my invention is to provide a device of the type described which is simple in construction, that is compact in form, and which is thoroughly practical commercially.

Other objects and advantages will appear in the following specification, and the novel features of the invention will be particularly pointed out in the appended claims.

My invention is illustrated in the accompanying drawings forming part of this application in which, Figure 1 is a front elevation of an embodiment of my invention, Figure 2 is a perspective view of the various parts of the mechanism illustrated in Figure 1 separated from one another, and Figure 3 is a side elevation of a part of the mechanism illustrated in Figure 2.

The primary purpose for which my adjustable clamping member is constructed is to lock the cooperating portions of the frame of an ironing board against movement relative to one another. Such a frame is shown in Figure 1, which consists in two pairs of parallel leg members 1 and 2 respectively, and having slots 3 therethrough, through which the bolt is normally projected and a wing nut or other like appliance disposed on the threaded end of the bolt.

My improved clamping member consists of a bolt 4 having a head portion 5 which is projected through the slots 3 of the frame members 1 and 2. A washer 6 is disposed immediately adjacent to the head 5. The bolt 4 projects entirely through the members 1 and 2 and extends beyond the outermost wall of the remote frame member 1.

A collar 5′ ordinarily of cast metal, is provided with a pair of inwardly extending lug members 6′ on one side thereof, diametrically opposed to one another. These members 6′ are arranged to lie in the slots 3 of the adjacent frame member 1 so as to prevent the collar 5′ from turning relative to the frame member 1.

The collar 5′ is further provided with a pair of semi-circular inclined bearing surfaces 7 terminating at their upper ends in upwardly extending stop members 8.

An operating lever 9 is provided, having a head portion 10 provided with an opening 11 therethrough, through which the bolt 4 may project. The diameter of the head portion 10 is slightly less than the opening 13 through the collar 5′, so that the wall 12 of the head portion 10 does not contact with the wall of the opening 13. A bearing member 14 is disposed on the outermost wall of the head portion 10, diametrically opposed to the handle 9. The purpose of this bearing member 14 is to ride upon one of the inclined surfaces 7, while the portion 15 of the handle 9 rides upon the opposite inclined surface 7.

A wing nut 16 having a threaded bore 17 therethrough is disposed on the outermost threaded end of the bolt 4.

It will be noted that the head member 10 has a cavity 18 in the upper outermost wall thereof for receiving the major portion of the wing nut 16. This is for the purpose of permitting a large number of threads in the bore 17 through the wing nut 16 to engage with the threads on the bolt 4 without necessitating the elongation of the entire clamping member.

From the foregoing description of the various parts of the device, the operation thereof may be readily understood. In tightening my improved clamping member, the user should first make certain that the wing nut 16 is tightened sufficiently to permit just enough play between the cooperating parts of the clamping member, so as to allow movement of the frame members 1 and 2. When this is done, a slight movement in a clockwise direction, (see Figure 2) of the lever 9 will cause the clamping of the members as though the wing nut 16 had been turned several times.

To unlock my adjustable clamping member, it is merely necessary to move the lever 9 in a counterclockwise direction a fraction of a revolution, whereupon the members 1 and 2 are free to move.

I claim:

1. An adjustable clamping member of the type described comprising a bolt having threads on the outer end thereof, a threaded thumb nut disposed on the threaded portion of said bolt, a collar, a lug on the inner end of said collar for preventing rotation of said collar relative to the material received in said clamping member, said collar being formed with a plurality of inclined surfaces on the outer end thereof, and a lever having an opening therethrough rotatably mounted on said bolt and having portions thereof arranged to bear upon the inclined surfaces of said collar.

2. A clamping device of the type described comprising a bolt having threads upon the outer end thereof, a threaded thumb screw disposed on the threaded portion of said bolt, a collar, a lug on the inner end of said collar fashioned for engagement with work held in said clamping member, whereby rotation of said collar relative to said work is precluded, said collar being further formed with a plurality of inclined surfaces on the outer end thereof, a lever having an opening therethrough and formed with a radially extending handle portion at one side of said opening, and a relatively short radially extending portion diametrically opposed to said handle portion, said radially extending shorter portion being arranged to bear against the inclined surface of said collar, whereby said collar and said lever are forced apart from one another when said lever is rotated.

JOHN A. SLAMA.